(12) United States Patent
Winkler et al.

(10) Patent No.: US 10,953,752 B2
(45) Date of Patent: Mar. 23, 2021

(54) BATTERY SYSTEM FOR A VEHICLE

(71) Applicant: Intilion GmbH, Zwickau (DE)

(72) Inventors: Norman Winkler, Zwickau (DE); Thomas Nawrath, Zwickau (DE); Stefan Reinhold, Zwickau (DE)

(73) Assignee: Intilion GmbH, Zwickau (DE)

( * ) Notice: Subject to any disclaimer, the term of this patent is extended or adjusted under 35 U.S.C. 154(b) by 0 days.

(21) Appl. No.: 16/477,821

(22) PCT Filed: Oct. 17, 2017

(86) PCT No.: PCT/EP2017/076512
§ 371 (c)(1),
(2) Date: Jul. 22, 2019

(87) PCT Pub. No.: WO2018/133960
PCT Pub. Date: Jul. 26, 2018

(65) Prior Publication Data
US 2019/0366859 A1 Dec. 5, 2019

(30) Foreign Application Priority Data
Jan. 17, 2017 (DE) ..................... 10 2017 100 771.7

(51) Int. Cl.
*H01R 4/50* (2006.01)
*B60L 3/00* (2019.01)
(Continued)

(52) U.S. Cl.
CPC ................. *B60L 3/00* (2013.01); *B60L 53/16* (2019.02); *B60L 58/10* (2019.02);
(Continued)

(58) Field of Classification Search
CPC ............ H01R 13/6275; H01R 13/6397; H01R 2201/26; B60L 3/00; B60L 58/10; B60L 53/16
(Continued)

(56) References Cited

U.S. PATENT DOCUMENTS 7,022,943 B1    4/2006  Barta
9,051,886 B2 *  6/2015  Nomura .................. F02D 29/02
(Continued)

FOREIGN PATENT DOCUMENTS

DE    10 2007 028386 A1    1/2009
DE    10 2010 029833 A1    1/2011
(Continued)

OTHER PUBLICATIONS

Summary of Office Action in application No. PCT/EP2017/076512, dated Jan. 9, 2019, 1 page.
(Continued)

*Primary Examiner* — Khiem M Nguyen
(74) *Attorney, Agent, or Firm* — Hickman Becker Bingham Ledesma LLP

(57) ABSTRACT

The invention concerns a battery system (200) for a vehicle (1), preferably for an industrial truck, comprising:
at least one rechargeable battery (210) for supplying at least a vehicle component (2) of the vehicle (1),
a charging component (50) for mechanically (52) and electrically (53) charging connection with an external charging device (310) to charge the battery (210) through the charging device (310) in a state of charge,
a safety device (60), which is arranged at least partially in the area of the charging component (50), for detecting the mechanical charging connection of the charging component (50) with the charging device
(Continued)

Figure 1:
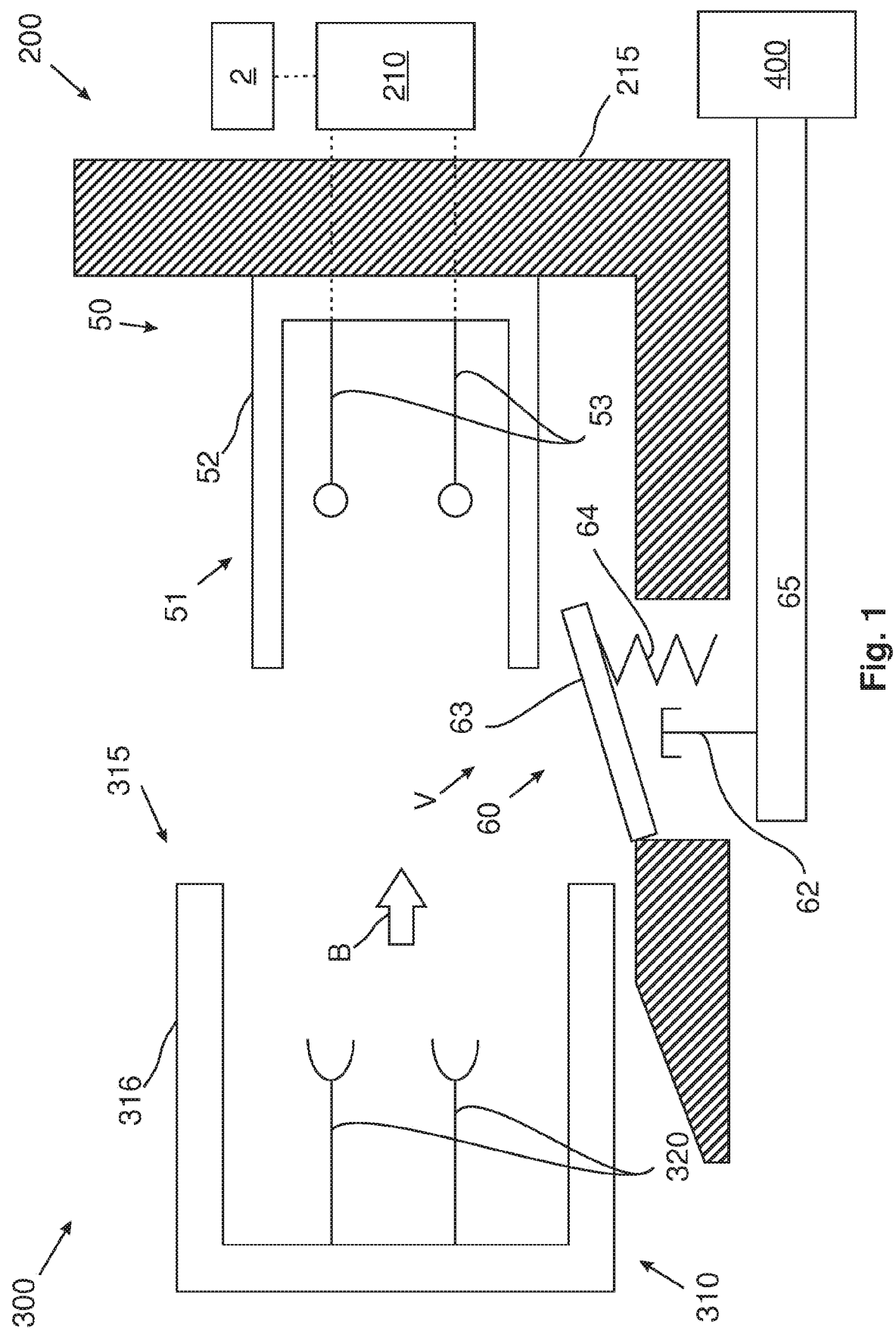

(310), so that a safety interruption of the power supply of the vehicle component (2) can be performed in the charging state.

20 Claims, 7 Drawing Sheets

(51) Int. Cl.
*B60L 58/10* (2019.01)
*B60L 53/16* (2019.01)
*H01R 13/627* (2006.01)
*H01R 13/639* (2006.01)

(52) U.S. Cl.
CPC ..... *H01R 13/6275* (2013.01); *H01R 13/6397* (2013.01); *H01R 2201/26* (2013.01)

(58) Field of Classification Search
USPC .................................................. 439/345, 500
See application file for complete search history.

(56) References Cited

U.S. PATENT DOCUMENTS

2011/0201223 A1 8/2011 Kurumizawa et al.
2017/0166070 A1* 6/2017 Dunger et al. ...... B60L 11/1818

FOREIGN PATENT DOCUMENTS

| DE | 10 2010 027006 A1 | 1/2012 |
| DE | 10 2012 110524 A1 | 5/2013 |
| DE | 10 2012 017 673 A1 | 6/2013 |
| EP | 2 371 610 A1 | 10/2011 |
| EP | 2 799 275 A1 | 11/2014 |

OTHER PUBLICATIONS

German Patent Office, "Summary of Search Report" in application No. 10 2017 100 771.7, dated Oct. 26, 2017, 1 page.
European Patent Office, "Search Report" in application No. PCT/US2017/076512, dated Feb. 13, 2018, 6 pages.
European Patent Office, "Examination Report" in application No. 17 791 638.4-1205, dated Oct. 9, 2020, 5 pages.

* cited by examiner

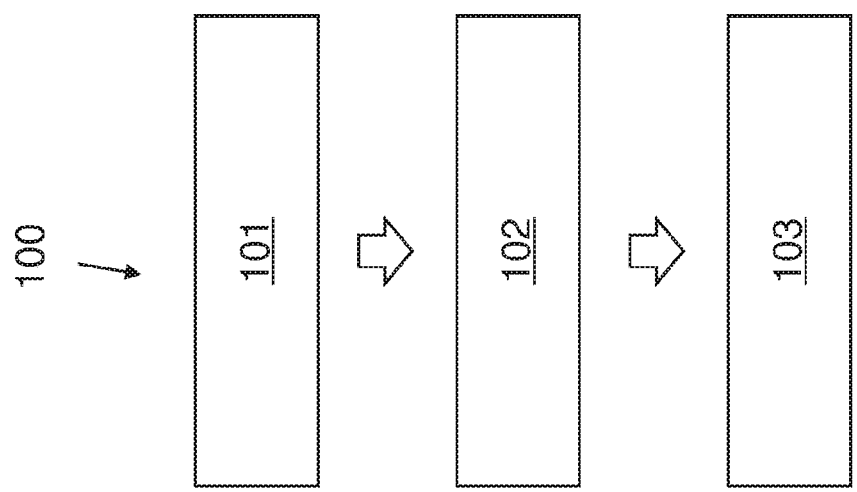

BATTERY SYSTEM FOR A VEHICLE

This invention relates to a battery system for a vehicle. Furthermore, the invention refers to a loading system and a method.

It is known from the state of the art that vehicles, in particular industrial trucks such as forklifts, are electrically operated and/or driven. Rechargeable batteries are used as an energy source to power a vehicle component, e.g. an electric motor. The vehicle's rechargeable battery (accumulator) is configured, for example, as a lithium battery (in particular a lithium-ion battery) in order to enable the vehicle to operate for a long time even during brief intermediate charges. Even short intermediate charges can often extend the operation (i.e. the service life) of the vehicle by hours.

For this reason, intermediate battery charges are becoming more and more popular in practice, e.g. in order to be able to put the vehicle into operation at short notice and extend its service life. Therefore, it is often desired that the vehicle or battery is connected to a charger in a simple and/or quick and/or ergonomic way. Conventionally, the battery is connected to both the vehicle (e.g. the vehicle electrical system) and the charger via the same connection points.

It may be possible for both the vehicle (i.e. a vehicle electrical system or vehicle component) and a charger plug of the charger to make electrical contact with the battery. Accordingly, the vehicle can be ready for operation during the charging process, as the energy supply is maintained by the battery. However, it must be avoided that in the event of careless handling, e.g. driving off with the vehicle, the charger still in contact and/or the vehicle are damaged.

In order to prevent this, technically complex measures must be taken. For example, it can be provided that the battery is first manually disconnected from the vehicle component (or vehicle electrical system) and only then is the charger contacted for charging. However, this is not very ergonomic and time-consuming. This drastically increases the duration of an intermediate charge.

It is therefore an object of the present invention to at least partially eliminate the disadvantages described above. In particular, it is an object of the present invention to provide a safer and/or faster and/or more ergonomic way to charge the battery.

The preceding object is solved by a battery system with the characteristics of the independent system claim 1, a charging system with the characteristics of the further secondary system claim and by a method with the characteristics of the independent method claim. Further characteristics and details of the invention result from the respective dependent claims, the description and the drawings. Features and details which are described in connection with the battery system conforming to the invention also apply, of course, in connection with the charging system conforming to the invention and the method conforming to the invention, and vice versa in each case, so that with regard to disclosure on the individual aspects of the invention, mutual reference is or can always be made.

The object is solved in particular by a battery system for a vehicle, preferably an industrial truck:
- at least one rechargeable battery, in particular a lithium-ion battery, for supplying (electrical) power to at least one vehicle component of the vehicle,
- a charging component for mechanical and electrical charging connection with an external charging device in order to charge the battery by the charging device in a state of charge (of the battery system), preferably by establishing an electrical connection and/or electrical power transmission between the charging device and the battery,
- a safety device which is arranged at least partially (spatially) in the area of the charging component in order to detect the mechanical charging connection of the charging component with the charging device, preferably so that a safety interruption of the power supply of the vehicle component can be performed in the charging state, preferably by an electrical connection between the vehicle component and the battery being at least partially interrupted and/or a current flow between the battery and the vehicle component being at least partially prevented and/or a main current to the vehicle being at least partially interrupted.

This has the advantage that even when the mechanical charging connection between the charging component and the charging device is detected, the power supply to the vehicle component is prevented, in particular a main current of the vehicle is interrupted. Such a mechanical charging connection is, for example, a form-fitting connection between a charging plug of the charging device and a charging socket of the charging component.

Thus, at least one problem can be reduced which occurs when only the electrical charge connection is detected. In order to detect an electrical charging connection, an electrically conductive bridge (or a switching component) can be provided in the charging plug (charger plug), for example, which makes contact with conductors of the battery system when plugged in and thus closes an electrical circuit. This can then be detected as an electrical charge connection. This can also trigger the interruption of the power supply. However, it can be problematic if there is a defect in the bridge and/or the mechanical charging connection (such as a mechanical locking of the plug housing with the socket housing) is made prior to the electrical charging connection. In this case, the charging device or charging plug is connected to the charging component, but this cannot be reliably detected. A further problem is that such a switching component must always be provided in the charging plug, which leads to additional costs and effort and reduces installation space if necessary. In the case of the invented battery system, on the other hand, it is possible that the mechanical charging connection is detected in order to perform the safety interruption. Accordingly, the inventive solution can reduce costs and technical effort and increase security.

A mechanical charging connection is preferably understood to be a physical and/or non-electrical contacting of the charging device, in particular of a housing of a charging plug of the charging device, with the charging component, in particular with a housing of a charging socket of the charging component. The charging connection is preferably a force-fitting and/or form-fitting and/or detachable connection between the charging device and the charging component. For example, at least one elastic and/or resilient (housing) element and/or at least one detent means of at least one of the housings can be used for this purpose in order to produce such a form-fitting and/or force-fitting connection. At least one of the housings and/or the elements and/or the detents may be made of plastic. This enables simple and safe contacting of the charging device for charging the battery.

A further advantage may be that the charging component is complementary to the charging device in order to establish the mechanical charging connection as a detachable force-fitting and/or form-fitting connection. For example, the charging component may have a charging socket which is complementary to a charging plug (plug) of the charging device (e.g. a charger). In other words, with regard to the geometry and/or diameter of an opening in the charging socket and/or the length, the charging socket may be configured to accept a charging plug. The mechanical charging connection can then be established by means of this mounting. For a form-fitting and/or force-fitting connection, for example, at least one latching means is provided for the charging component and/or the charging device, which latching means produces a form-fitting and/or force-fitting connection during reception (e.g. insertion of the plug). This ensures a safe and reliable mechanical connection. At the same time, the electrical charging connection can be established by contacting the electrical connections of the charging component and the charging device with each other.

The safety device can preferably have an actuating element which is arranged adjacent to the charging component, in particular a charging socket, in such a way that force is exerted on the actuating element by the charging device, in particular a charging plug, preferably a housing part of the charging plug, prior to and/or during the production of the (in particular mechanical) charging connection, so that detection can be performed by the actuating element. For example, the actuating element may be configured to be movable and/or pivotally mounted on a housing of the safety device and/or the loading component. The actuating element is preferably configured as a rocker. This has the advantage that a simple and reliable detection of the mechanical charge connection can be performed. In particular, the actuating element is actuated exclusively mechanically (and thus not electrically as with the switch component).

Preferably, the charging component housing, in particular a housing part which includes a charging socket, is shaped in such a way that a safety path of the safety device is opened before or when a form-fitting connection is established between the charging plug and the charging socket. Preferably, an actuating element on the housing part is provided for this purpose in order to detect the movement into form-fitting. For this purpose, for example, the actuating element is arranged on the housing part in such a way that it is arranged in a connecting area (e.g. in front of latching means or the like for positive form-fitting) in order to detect the movement into the form-fitting. This allows the dangerous form-fitting to be detected as soon as the charging plug approaches the final position in the charging socket. The (initiated) form-fitting is detected and not the electrical contact (i.e. the electrical charging connection), which can significantly increase safety. Even a faulty electrical contact does not lead to a safety risk.

Optionally, it may be possible that only the mechanical charge connection, and thus not the electrical charge connection, is detected. This has the advantage that the technical effort as well as the costs for the detection, in particular for an electrical switching component, can be reduced.

Preferably the charging component is arranged on a battery housing, preferably fixed and/or immovably fastened to the battery housing, and in particular the safety device is arranged at least partially between the charging component and the battery housing, preferably fastened. In particular, this reduces the required installation space.

Optionally, the battery system according to the invention may provide that the charging device is configured and/or arranged externally and/or separately and/or spatially separated from the charging component and preferably is not part of the battery system according to the invention. This has the advantage that different charging devices can also be used as charging devices.

In a further possibility, it may be provided that a (in particular purely) mechanical actuating element of the safety device is arranged directly or adjacent to a housing of the charging component, preferably in a connecting area in which the charging device, in particular a charging plug, can be introduced for charging connection to the charging component, in particular a charging socket, by a contacting movement, so that preferably the actuating element can be actuated, in particular moved, by the contacting movement of the charging device. Accordingly, it may be possible that, when the charging device or charging plug is inserted into the charging component or charging socket, force is exerted on the actuating element by the charging device or charging plug, since, for example, the actuating element is arranged in the connection area in which the charging device or charging plug extends when the mechanical charging connection is complete. This has the advantage that a simple and cost-effective detection is possible, which detects the mechanical charge connection particularly reliably due to the detection of the spatial presence of the loading device in the connection area.

It may be provided within the scope of the invention that a mechanical actuating element of the safety device is arranged in a connecting area of the charging component in such a way that force is exerted by the charging device in the course of establishing the mechanical charging connection before at least one electrical contact of the charging device makes contact with a respective counter-contact of the charging component. Contacting, i.e. the electrical connection of the electrical contact with the counter-contact, is used, for example, to transfer energy from the charging device to the battery. Here, for example, the charging device is configured as a charger which performs a charging process to charge the battery. Thus, a reliable charging is possible.

A further advantage may be that an electrical switching means of the safety device is provided, and in particular is integrated into an electrical safety path of the battery system, preferably connectable via the safety path to a battery management system to interrupt the safety path to detect the mechanical charge connection. For example, the battery management system is electrically connected to the safety path via at least two electrical lines, which thus form a circuit with the switching means. In the event of an interruption by the switching means, a current flow through the circuit can therefore be prevented. In particular, this interruption can be detected by the battery management system to detect the mechanical charge connection, e.g. by an evaluation and/or processing device (in particular as a monitoring and/or operating device) of the battery management system. In particular, the switching means is configured as a pushbutton, which is actuated by the actuating element. Thus, the detection can be performed reliably. In particular, it offers an advantage if the switching means interrupts the safety path for detection and is therefore preferably configured as a normally closed contact. This ensures that even in the event of a fault (with interrupted power), the power supply to the vehicle component is interrupted.

It may also be provided that
in a normal state (of the battery system), the switching means closes the safety path so that current flows through the safety path to detect a charging component mechanically disconnected from the charger; and
in the state of charge (of the battery system), the switching means opens the safety path so that current flow is completely or substantially prevented to detect a charging component mechanically connected to the charging device.

For example, the power supply to the vehicle component may be established in the normal state and interrupted in the charge state. For example, the current flow is evaluated by a processing device (in particular as a monitoring and/or operating device) of the battery management system. In particular, this has the advantage that if the current flow is interrupted incorrectly, the battery system is converted into a safe state.

A further possibility may be for an actuating element, in particular a mechanical rocker, to be arranged adjacent to a switching means and preferably movably mounted on a housing of the safety device and/or on a housing of the charging component in order to actuate the switching means, in particular when force is exerted on the actuating element, by an at least partially linear or rotary or tilting or pivoting movement of the actuating element. Thus, the mechanical movement due to the establishment of the mechanical charging connection can be used to generate an electrical signal (in particular: interruption of the current flow). In particular, a battery management system can detect this signal in order to detect the mechanical charge connection and interrupt the power supply of the vehicle component in the event of positive detection. For example, the switching means is configured as an electronic or mechanical switch, in particular a pushbutton, for example a transistor, in order to prevent the current flow. In particular, the actuating element is spring-loaded, e.g. by a spring element, in order not to actuate or close the switching means in the normal state with an unconnected charging connection.

It is also conceivable within the scope of the invention that at least one electronic switching device is provided for establishing an electrical connection between the battery and the vehicle component, and a control path, in particular of a battery management system, is electrically connected to the electronic switching device, so that, when the mechanical charging connection is detected, the electronic switching device can be brought into a switched-off switching state via the control path in order to at least partially interrupt the electrical connection between the battery and the vehicle component. This means that the power supply to the vehicle component can be reliably interrupted when the mechanical charging connection is detected, i.e. the safety interruption can be initiated. For example, the switching device and the switching means are configured as electronic switches. In particular, a processing device (preferably as a monitoring and/or operating device) is provided in order to control the switching device via the control path.

Furthermore, it may be provided that a battery management system is provided which is preferably electrically connected to at least one switching device via at least one or respective control paths, so that depending on the detection of the mechanical charging connection:
for a charging process (in the charging state) with positive detection, a first electronic switching device can be brought into a switched-on first switching state and a second electronic switching device can be brought into a switched-off second switching state, and/or
for a power supply provided to the vehicle component in the event of negative detection (in the normal state), the first electronic switching device can be brought into a switched-on first switching state and the second electronic switching device can be brought into a switched-on second switching state.

Furthermore, it is conceivable that the vehicle component is configured as an electrical drive component, in particular as an electric motor, of the vehicle.

It may be possible that the battery system according to the invention is intended:
at least two (electrical and/or electronic) switching devices each for establishing and/or interrupting an electrical connection between the battery and the vehicle component, in particular for establishing and/or interrupting the power supply to the vehicle component.

Furthermore, it is conceivable that a charging connection point is provided which is electrically connected to the battery (optionally fixed and/or non-detachable) independently of the (electronic) switching devices, and in particular is configured for (optionally detachable) electrical connection to an (external) charging device, so that charging of the battery can preferably be performed by the charging device independently of a switching state and/or, when the switching state is switched off, at least (or exactly) one of the (electronic) switching devices can be charged. This has the advantage that the power supply to the vehicle component can be interrupted even during charging, and thus the safety interruption of the power supply to the vehicle component can be provided.

The charging device is preferably configured as an external charging device, i.e. outside the battery system and/or the vehicle.

In particular, a switched-off switching state refers to a blocked or open switching state for blocking a current flow at least in one current direction through the corresponding switching device, whereas a switched-on switching state refers in particular to an enabled or closed switching state for enabling the current flow.

The switched-off switching state of the switching devices preferably serves to interrupt the respective electrical connection, in particular to at least mostly reduce an electrical current flow through the respective connection, so that the complete energy supply of the vehicle component can be interrupted. The energy supply is interrupted in particular by the fact that energy transmission via the connection is blocked.

In particular, there is an advantage in that the charging connection point is electrically connected to the battery independently of the (electronic) switching devices. This enables that at least one of the electronic switching devices for charging are to be converted (i.e. brought into a locked state) into a switched-off (i.e. opened and/or locked) switching state (i.e. brought into a locked state), so that in particular an electrical connection of the vehicle component with the battery is locked by the switching device. In other words, it performs the safety interruption of the power supply of the vehicle component. This prevents the complete transfer of energy from the battery to the vehicle component, and the vehicle cannot be moved or operated. In other words, the power supply to the vehicle component (i.e. to the vehicle) can be cut off despite the charger being plugged in (i.e. the charger or charging plug) and/or despite the charging process. In this way, efficient immobilization can be provided. This can also be implemented in a technically simple and cost-effective manner, as no further adjustments to the vehicle are necessary. In particular, the immobilizer may only be provided by the battery system.

According to an advantageous further embodiment of the invention, it can be provided that at least (or exactly) a first and a second (electronic) switching device are provided, whereby preferably the first (electronic) switching device is integrated into a first current path, and can be brought into a switched-on first switching state so that a first electrical connection of the battery to the vehicle component and/or to the charging device in the first current path can be established, the second (electronic) switching device is integrated into a second current path, and can be brought into a switched-on second switching state so that a second electrical connection of the battery with the vehicle component can be established in the second current path, preferably the charging connection point for electrically connecting the battery to the charging device being implemented independently of the second switching state of the second electronic switching device. In particular, two electrical connections must be active (the first and second electrical connections) for charging via the charging device and/or two electrical connections must also be active (via the first and second current path) for operating the vehicle component. This has the advantage that a safer way of charging can be provided by preventing the vehicle from moving.

In particular, it may be possible that charging of the battery by the charging device can be carried out and/or is performed by at least one or exactly one of the electronic switching devices, in particular the second electronic switching device, when the switching state is switched off (and/or independently of a switching state). In particular, the battery system comprises a first electronic switching device in a first current path (possibly positive pole of the battery) and a second electronic switching device in a second current path (possibly minus branch of the battery). Preferably the two switching devices (related to the current direction to be blocked) are integrated antiparallel into the current paths, so that two different current directions in particular can be blocked by the switching devices (e.g. from the battery towards the vehicle component and vice versa). In particular, a second connection point and a third connection point may be used for contacting the battery with the vehicle (i.e. with the vehicle component). The third connection point is, for example, connected to the first electronic switching device and the second connection point to the second electronic switching device (if necessary directly for example immediately).

In principle, the second and third connection points could also be used for connection to the charger. This has the disadvantage, however, that both switching devices must remain closed for charging, so that the vehicle component continues to be supplied with energy by the battery. A first connection point (charging connection point) can therefore be provided, which is electrically connected to the battery independently of the (first or second) switching state of the (first or second) electronic switching device. This enables, for example, that by switching the second electronic switching device to the switched-off (second) switching state, the energy transfer from the battery to the vehicle component can be blocked and the charger can still be connected to the battery for charging via the first connection point. At the first connection point, a tap and/or contact for connection to the charger (or charger plug) can be provided and/or provided constructively. In particular, this tap or the first connection point is used exclusively for contacting the charger. In particular, the circumstance is used that the respective switching devices as semiconductor (switches) only block the current flow in one direction. Preferably the first connection point is directly connected to the ground (at least) of one of the battery cells of the battery.

In particular, the connection points (in particular also the charging connection point) may concern positions and/or (e.g. the same or common) electrical potentials on/for an electrical conductor, and preferably also include electrical connections or the like on the conductor. However, connecting point inevitably must not be an element, which constructional will stand out from other conductor. Thus, at least one of the connection points (in the broader sense) can also refer to only one position in the circuit. In the narrower sense, however, at least one of the connection points already has adaptations which make contact possible, such as a coupling element (e.g. a plug connector or a receptacle for a plug connector or the like).

In particular, to provide the power supply from the battery to the vehicle component after charging, both switching devices must be controlled again (in a switched-on or closed switching state) in such a way that both switching devices allow the current to flow. It may also be possible for the battery management system to control the respective switching devices in different ways during normal operation, e.g. even when the switch is switched off, in order to perform various management functions. One such management function is, for example, a current flow control. In order to reliably and completely block both current flow directions, both antiparallel switching devices, for example, must be transferred to the switched-off switching state.

It is also conceivable that when the charging plug or charging device is contacted, in particular by at least one switch component, at least one (electrical) signal is generated which causes the second electronic switching device to switch over to the switched-off (second) switching state (and thus blocks the current flow in at least one current direction through the second electronic switching device). This means that the vehicle component can no longer be (sufficiently) supplied with energy by the battery, reliably preventing the vehicle from driving off.

In particular, the switching component is configured as a passive and/or electromechanical component, in particular an electronic component, for detecting the electrical charge connection. For example, the switching component is configured as an auxiliary contact and/or bridge which sends an electrical control signal to and/or causes the battery management system when the charging plug is contacted. For example, it can be provided that the auxiliary contact bridges two signal lines when contacting in order to generate the control signal. The control signal can then, for example, be read out by a (possibly passive) circuit (e.g. the battery management system), whereupon the second electronic switching device can be forced into a switched-off (second) switching state if the control signal is detected positively. In particular, the circuitry of the battery system can be configured in such a way that the control signal cannot be overdriven by other components. Alternatively or additionally, it is conceivable that the switching component fulfils a further function, such as, for example, successful electrical contact for the charging device. If necessary, the switching component only fulfils a functionality for the charger and is therefore not used for the battery system or by the battery management system. This enables particularly reliable operation because both an electrical contact (the electrical charge connection, which is detected in particular by the switching component) and a mechanical contact (mechanical charge connection) can be detected.

The switch component is preferably electrically conductive and/or flat and/or pin-shaped, and in particular firmly connected to the charging plug. When connecting the charging plug, the switching component prefers to contact a corresponding counter contact of the battery system.

Preferably, the vehicle component is configured as an on-board electrical system or a drive or part of a drive or as an electric motor or similar of the vehicle. In particular, the vehicle component serves to drive, i.e. to move, the vehicle. In other words, it may be possible for the vehicle component to be propelled by an energy supply to the vehicle component or by providing energy from the battery for the vehicle component. The advantage of interrupting this energy supply during a charging process is that it prevents propulsion and thus reduces the risk of damage to the charging device.

In particular, the vehicle is configured as an electric vehicle and/or as an industrial truck and/or as a motor vehicle. For example, the industrial truck is configured as a means of transport which, by its design, runs on wheels on the floor and is freely steerable and/or equipped for the transport, pulling and/or pushing of loads and/or intended for internal use. It is also conceivable that the industrial truck is configured for lifting, stacking and/or storing loads on racks and/or can pick up and set down loads itself. For example, this could be an electric walking device or an electric stand-alone device or an electric drivers seat device.

The battery system preferably comprises at least one (rechargeable) battery, which has (in each case) one or more battery cells (in particular galvanic cells). For example, the battery cells can be connected and/or grouped together, possibly as a battery module or cell stack or the like. Furthermore, it may be provided that the battery system comprises at least one battery management system which is, for example, electrically connected to or associated with the battery (and/or one or more battery cells and/or battery modules and/or cell stacks). In particular, the battery management system serves to control and/or monitor a discharge process of the battery (or battery cells) and/or to control and/or monitor a charging process of the battery, i.e. to charge the battery system, in particular the battery cells of the battery. For this purpose, the battery management system can, for example, control the first electronic switching device and/or the second electronic switching device, in particular via a control path of the respective switching device. Thus, the battery management system can be electrically connected to the respective switching devices.

In particular, the battery serves to power at least one vehicle component of the vehicle, i.e. to operate the vehicle component, e.g. to drive or move the vehicle. For example, the battery can be electrically connected to a vehicle electrical system. In particular, the battery supplies an electrical voltage and/or the vehicle component has an electrical voltage in the range of 10 V to 100 V, preferably 20 V to 80 V, preferably 40 V to 60 V.

The rechargeable battery is preferably configured as a lithium battery (especially lithium-ion battery). Such a lithium battery has the advantage that it can be recharged at a high charging rate. For example, the battery can be fully charged within a maximum of one hour, and/or intermediate charges of a maximum duration of a few minutes can be performed to extend the service life by hours. In particular when used with industrial trucks, the advantage can be achieved that so-called intermediate storage can be performed in order to be able to operate the industrial truck at short notice.

A further possibility may be to provide that a control path, in particular a second control path, in particular of a battery management system, is electrically connected to at least one of the electronic switching devices (in particular to the second electronic switching device), so that, when connected to the charging device, the at least one of the electronic switching devices can be brought into a switched-off (second) switching state via the control path in order, in particular, to interrupt at least partially the (second) electrical connection of the battery to the vehicle component. This enables automatic disconnection of the battery power supply to the vehicle component so that an immobilizer can be provided when the charger (i.e. charger) is contacted. This can further increase safety during charging.

In particular, with regard to the electronic switching devices, a (possibly at least partial or complete) interruption of an electrical connection and/or a current flow is also understood to mean a blocking of the current flow at which only a very small current flow occurs (as is technically unavoidable in the blocking state for support-conductor switches). In other words, the current flow is predominantly reduced when the switching state is switched off, so that effectively no energy supply is possible for the operation of the vehicle component.

The invention may preferably provide that the first current path is configured as a positive current path which is electrically connected to a positive pole of the battery, and the second current path is configured as a negative current path which is electrically connected to a negative pole of the battery. In particular, the first connection point is electrically connected directly and/or directly to the negative pole of the battery (i.e. in particular to at least one ground of at least one battery cell). This means that charging can be performed reliably and safely.

Optionally, it may be provided that a battery management system is provided which is electrically connected to the switching devices via respective control paths, so that preferably for a charging process, a first electronic switching device can be brought into a switched-on first switching state and a second electronic switching device can be brought into a switched-off second switching state, and/or the first electronic switching device can be brought into a switched-on first switching state and the second electronic switching device can be brought into a switched-on second switching state for a completely provided power supply to the vehicle component, and/or for a complete interruption and/or a power supply to the vehicle component which is interrupted at both poles, the first electronic switching device can be brought into a switched-off first switching state and the second electronic switching device can be brought into a switched-off second switching state, so that both the power supply and charging are preferably prevented.

It may also be possible that, in addition to the completely provided or completely interrupted power supply, there are other power supply states which result from different switching states of the switching devices. These can be controlled e.g. by the battery management system to provide various management functions for the battery system (e.g. current flow control and the like). This allows flexible and adaptable operation of the battery system.

It is also advantageous if, in the context of the invention, one of the electronic switching devices and the charging connection point (first connection point) are each directly connected to the battery, in particular to a negative pole of the battery. This enables to an electrical connection to be established with the battery via the charging connection point, independent of the switching device, in order to perform the charging process more safely and reliably.

In accordance with an advantageous further embodiment of the invention, it may be provided that the electronic switching devices are integrated antiparallel to one another (i.e. in particular blocking in different current directions or counter-rotating with respect to the blocking direction) in a circuit for the power supply of the vehicle component, wherein preferably the electronic switching devices are each configured as semiconductor switches, preferably as power semiconductor switches, in particular as field effect transistors. This results in a multitude of possible management functions that can modify the current flow in the battery system. Alternatively or additionally, it may be provided that the electronic switching devices are configured to block a current flow (of the battery or power supply) in only one current direction in the respective switched-off (i.e. blocked) switching state.

It may be advantageous if, within the scope of the invention, the battery system for powering the vehicle component is configured as an electrical drive component, in particular as an electric motor, of the vehicle. Thus, the vehicle component serves for the propulsion of the vehicle. In particular, in order to operate the vehicle component, i.e. to move the vehicle, it is necessary for the battery to provide power to the vehicle component. It may be provided that this energy supply is prevented when the battery is charged in order to increase safety during the operation of the vehicle during the charging phase.

It may optionally be possible for the charging connection point to be configured as a first connection point, wherein a second connection point is provided for connecting the vehicle component to the battery via a second electronic switching device and a third connection point is provided for connecting the vehicle component to the battery via a first electronic switching device, wherein the first connection point is integrated in the current path between the second electronic switching device and the battery, so that there is preferably an electrical connection between the first connection point and the battery independently of a second switching state of the second electronic switching device and/or also when the second switching state is switched off. In particular, the third connection point may also be provided as a further connection point for charging to the charger, the charging connection point (first connection point) and the third connection point being connected to different terminals or poles of the charger. This means that charging can be performed easily and safely.

Another object of the invention is a charging system for charging at least one battery of a battery system of a vehicle, preferably an industrial truck. In particular, it is provided that the charging system has at least one of the following components:
- the battery for supplying power to at least one vehicle component of the vehicle, preferably an electric motor,
- at least one charging device, preferably an external charging device with a charging plug, for transmitting energy to the battery, which charging device is performed separately from the battery system,
- a charging component, preferably charging socket, of the battery system for releasable mechanical and electrical charging connection to the charging device to effect energy transfer,
- a safety device which is arranged at least partially in the area of the charging component in order to preferably detect the mechanical charging connection, so that a safety interruption of the power supply to the vehicle component can preferably be performed.

Preferably, the charging system according to the invention may have a battery system according to the invention. The charging system according to the invention thus has the same advantages as those described in detail with regard to a battery system according to the invention.

Optionally, the loading system according to the invention may be provided that the loading system further comprises at least one of the following components:
- at least one rechargeable battery of the battery system for supplying power to at least one vehicle component of the vehicle,
- at least two electronic switching devices of the battery system, each for making an electrical connection between the battery and the vehicle component,
- at least one charging device (charger) to transfer energy to the battery.

In particular, it is conceivable here that a charging connection point of the battery system is provided which is electrically connected to the battery independently of the electronic switching devices and is preferably configured for detachable electrical connection to the charging device, so that energy can be transmitted through the charging device even when the switching state is switched off and/or at least one of the electronic switching devices is independent of a switching state.

Another advantage may be that the charging device has a charging plug, preferably at least one first connection of the charging plug for charging the battery being electrically and/or detachably connected and/or connectable to at least the charging connection point, and at least one second connection of the charging plug for charging the battery being electrically and/or detachably connected and/or connectable to at least one further (in particular a third) connection point. This makes it possible to charge the battery easily and reliably.

Furthermore, it may be provided that the charging device, preferably a charging plug of the charging device, has at least one electrical switch component, in particular a passive and/or electromechanical component, which is preferably configured to initiate a switch of at least one of the electronic switching devices to a switched-off switching state when electrical contact is made with the battery system, in particular with a connection of a battery management system, so that the power supply (of the battery) to the vehicle component, in particular a drive of the vehicle, is prevented preferably when the charging plug is contacted to perform charging. This ensures safe separation of the battery from the vehicle component when the charger contacts the battery system. Alternatively, it is conceivable that the switching component does not initiate the switching of the at least one electronic switching device, but merely serves to evaluate and/or provide a further function, e.g. by the loading device.

Another subject according to the invention is a method, in particular a charging method, for charging in a battery system of a vehicle, preferably an industrial truck, having at least one rechargeable battery of the battery system for supplying power to at least one vehicle component of the vehicle, and preferably at least two electronic switching devices of the battery system each for establishing an electrical connection between the battery and the vehicle component.

Preferably at least one of the following steps is performed, whereby the steps are preferably performed one after the other or in any order, and especially individual steps can be performed repeatedly:

Connecting an (external) charging device to a charging component of the battery system to establish a mechanical and electrical charging connection, Initiating switching off of at least one of the electronic switching devices into a switched-off switching state when (in particular exclusively) the mechanical charging connection (in particular between housing parts of the charging device and the charging component) is detected, so that the power supply to the vehicle component is predominantly reduced and/or completely interrupted, Initiating a charging process to charge the battery by the charging device.

Thus, the method according to the invention has the same advantages as described in detail with regard to a battery system and/or charging system according to the invention. In addition, a battery system and/or charging system in accordance with the invention may be operated by the method, if applicable.

An advantageous feature of the invention may be that the battery system is transferred from a sleep mode to a charge state on the basis of the detection (of the mechanical charging connection), wherein a first electronic switching device is transferred to a switched-off first switching state and a second electronic switching device is transferred to a switched-off second switching state preferably in the sleep mode for a complete interruption (of the power supply) to the vehicle component. This has the advantage that by establishing the mechanical charging connection, the battery system can easily be switched from sleep mode to normal mode. The switching mode (possibly also as standby mode) is intended, for example, to reduce the power consumption of the battery system and/or to avoid deep discharge.

Preferably, within the scope of the method according to the invention, preferably the loading method, it is intended that the vehicle is configured as an industrial truck. In particular, the vehicle comprises at least one rechargeable battery of the battery system for supplying power to at least one vehicle component of the vehicle. Preferably, at least two (electronic) switching devices of the battery system are provided in each case for establishing an electrical connection (i.e. an electrically conductive connection or a connection suitable for conducting current) between the battery and the vehicle component.

It is preferred that at least one of the following steps is performed in the method according to the invention, whereby preferably the steps are performed one after the other or in any order, whereby especially preferred individual steps can also be performed repeatedly:

the battery system comprises a charging device connected to a charging connection point of the battery system which is electrically connected to the battery independently of the electronic switching devices, initiating a switch-off of at least one of the electronic switching devices into a switched-off switching state, so that the power supply of the vehicle component is interrupted, i.e. is at least predominantly reduced and/or completely interrupted, i.e. in particular a complete or sufficient power supply of the vehicle component and/or a propulsion of the vehicle by the vehicle component is prevented, initiating a charging process to charge the battery by the charging device.

Furthermore, it is conceivable within the scope of the invention that the initiation of switching off the at least one of the electronic switching devices is triggered by connecting the charging device, in particular automatically by establishing an electrical contact when connected by at least one switch component of a charging plug. This further increases safety during charging (the charging process).

Also protected is a vehicle with a battery system according to the invention and a vehicle component, preferably to perform a method conforming to the invention.

Further advantages, features and details of the invention result from the following description, in which embodiments of the invention are described in detail with reference to the drawings.

The features mentioned in the claims and in the description may be essential to the invention either individually or in any combination. They show schematically in each case:

FIG. 1A representation of parts of a battery system according to the invention, when the mechanical charging connection is open, FIG. 2A further illustration of parts of a battery system according to the invention, with a partially closed state of the mechanical charging connection, FIG. 3A further illustration of parts of a battery system according to the invention, in particular a safety device, FIG. 4A representation of a charging system or battery system in accordance with the invention by means of a schematic diagram, FIG. 5A further schematic diagram of parts of a battery system according to the invention and of a charging system according to the invention, FIG. 6A further schematic diagram of a charging system according to the invention and a battery system according to the invention, FIG. 7A representation for the visualization of a method according to the invention.

In the following figures, the identical reference signs are used for the same technical characteristics, even for different embodiments.

Figure 2:
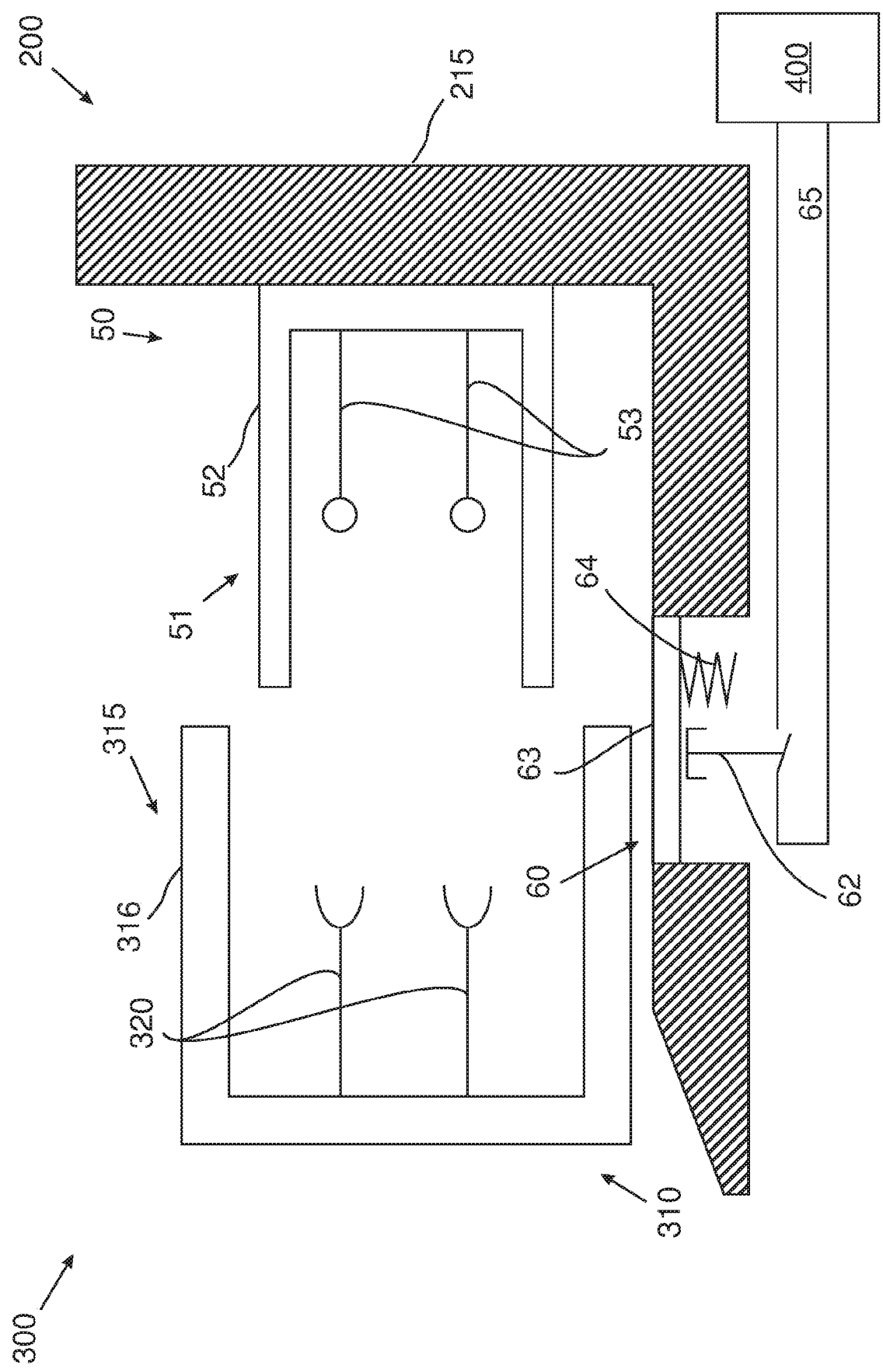

FIG. 1 schematically shows a battery system 200 or a charging system 300 according to the invention. The battery system 200 comprises a battery 210, which can be connected to a vehicle component 2 of vehicle 1 for power supply. In order to charge the battery 210, it is necessary to provide an electrical connection of the battery 210 to an external charger 310, in particular a charger 310. To enable, a charging component 50 is provided which, for example, has a separate charging socket 51 for a charging plug 315 of the charging device 310. In particular, the electrical connection (i.e. the electrical charging connection) is accompanied by a mechanical connection (i.e. the mechanical charging connection). In order to ensure a safe and reliable electrical charging connection, it may be advisable to fix the charging device 310 with the charging component 50 by means of the mechanical charging connection.

Accordingly, the mechanical charging connection can also use a form-fitting connection or the like between the charging plug 315 and the charging socket 51.

Furthermore, FIG. 1 shows two contacts 320 of the charger 310, which are part of a charging plug 315. In order to establish the charging connection, the charging plug 315 is moved in the direction of movement of the contacting movement B into the connection area V, so that the charging plug 315 is inserted into the charging socket 51. This first leads to the mechanical charging connection and then to the contacting of the at least two contacts 320 with at least two counter contacts 53 of the charging component 50, which in turn establishes the electrical charging connection. The mechanical charging connection is in particular a mechanical form-fitting and/or force-fitting connection of a charging component housing 52 with a plug housing 316 of the charging plug 315, e.g. by not shown locking means.

To ensure safe and reliable charging, it makes sense to disconnect the power supply to vehicle component 2 when the charging device 310 is connected. For this purpose, the electrical charge connection can always be detected in order to interrupt the energy supply. In order to achieve further safety, it is conceivable to detect the mechanical charge connection, in particular to detect a form-fitting connection, in order to initiate the interruption. For this purpose, a safety device 60 can be provided in the area of the loading component 50, e.g. in the immediate vicinity (e.g. maximum 1 mm or maximum 5 mm or maximum 1 cm or maximum 4 cm away from the loading component 50). In particular, the safety device 60 is arranged directly on a battery housing 215 of the battery 210. Preferably the safety device 60 has at least one actuating element 63, in particular a rocker, which extends at least partially in the connecting area V. The actuating element 63, in particular the rocker, is provided with a safety device 60. This enables the actuating element 63 to be actuated, in particular moved, when the loading device 310, i.e. in particular the charging plug 315, is moved into the connection area V. This is shown schematically in FIG. 2. By moving the actuating element 63, a switching means 62, preferably a normally closed contact and/or push-button, can be actuated which, for example, opens a safety path 65. Thus, in the state of charge (with detected mechanical charge connection) the circuit of the safety path 65 is opened and thus a current flow is interrupted, which can be detected by a battery management system 400. This achieves the advantage that the battery management system 400 can interrupt the energy supply of the charging component 50 when a mechanical charging connection is detected, as described in more detail below.

In particular, a spring element 64 is also provided, which can be connected to the actuating element 63. This allows a spring-loaded actuating element 63 to be provided to close the circuit in the normal state (with the charging connection open).

Figure 3:
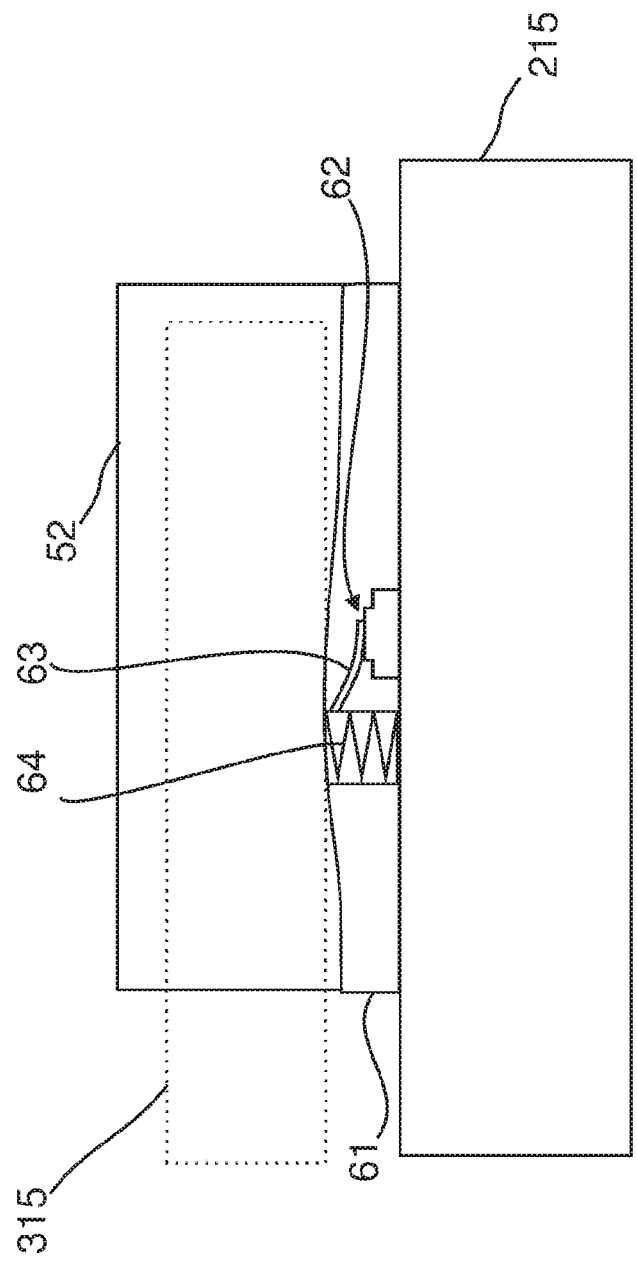

FIG. 3 shows the structure of the safety device 60 with further details. A charging plug 315 with dotted lines is shown to indicate the position of charging plug 315 in charging socket 51. Furthermore, the configuration of the switching means 62 as a pushbutton is shown, which is actuated by the (possibly spring-loaded) actuating element 63. The arrangement of the components of the safety device 60 can also be seen in the area of the charging socket 51, whereby the attachment of the shown parts of the safety device 60 to a battery housing 215 or to a housing 61 of the safety device 60 can be seen.

Figure 4:
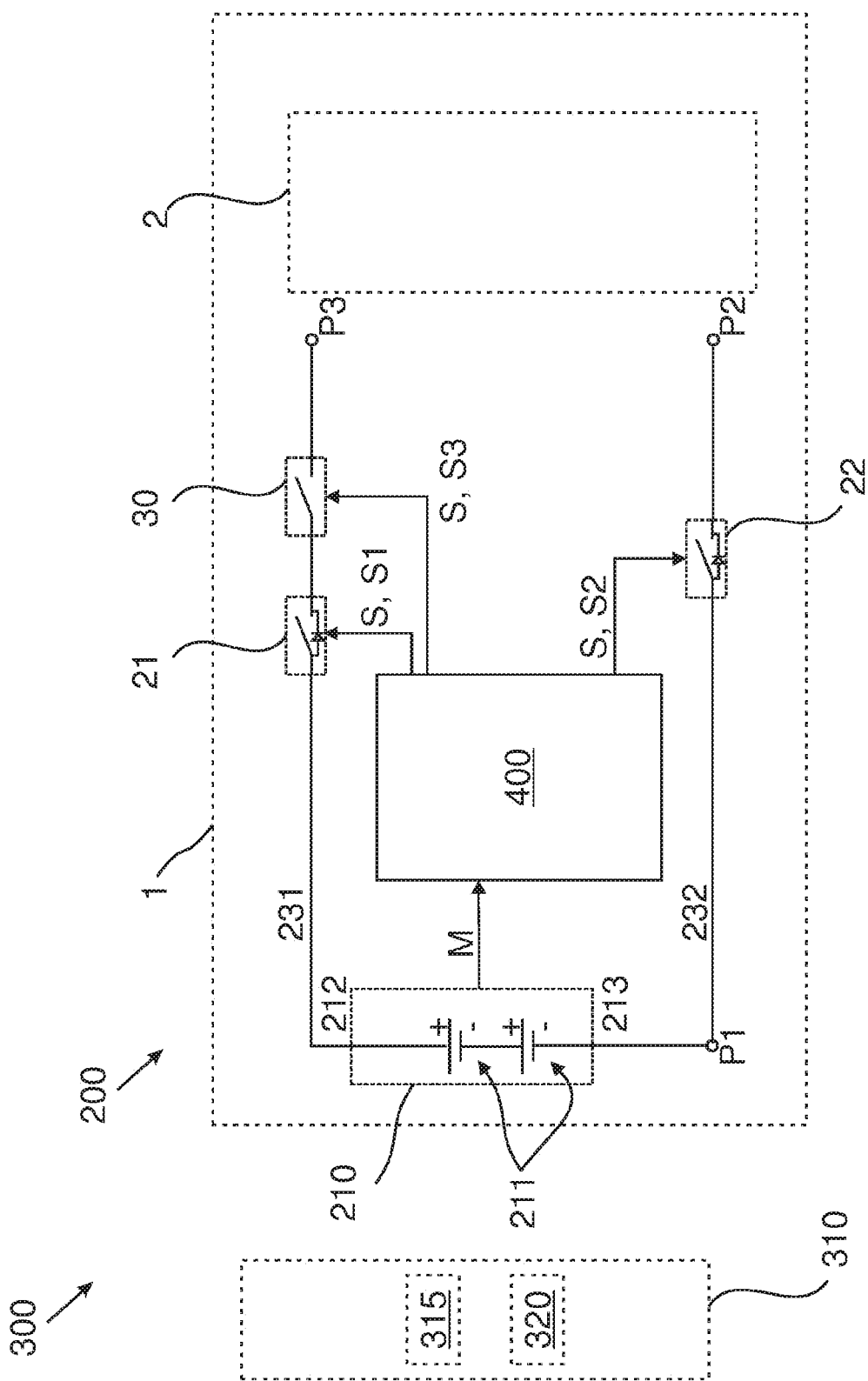

FIG. 4 schematically shows the basic structure of a charging system 300 in accordance with the invention and a battery system 200 in accordance with the invention. In particular for moving, a rechargeable battery 210 of vehicle 1 is provided for operating a vehicle 1. The battery 210 can have one or more battery cells 211, as shown schematically. In order to enable an energy supply to at least one vehicle component 2 of the vehicle, for example an electric motor, the rechargeable battery 210 is connected to the vehicle component 2 via a second and third connection point P2, P3. Vehicle component 2 (e.g. in addition to the electric motor) may also include an electrical system and/or an on-board power supply of vehicle 1.

The power supply of vehicle component 2 is made possible in particular by the fact that a first current path 231 connects the third connection point P3 with a positive pole 212 of the battery 210, and a second current path 232 connects the second connection point P2 with a negative pole 213 of the battery. Furthermore, electronic switching devices 20 can be provided in the respective current paths 231, 232. The switching devices 20 enable the current flow to be blocked when in the switched-off switching state and to allow the current flow in the switched-on switching state. In particular, the electronic switching devices 20 are configured as semiconductor switches, so that the respective switching device 20 blocks the current flow only in one current direction when the switching state is switched off. This enables complex and flexible control of the current flow, in particular by a battery management system 400. For this purpose, the battery management system 400 can, for example, be electrically connected to and/or control the respective switching devices 20 via control paths S, in particular via a first and second control path S1, S2.

Optionally, it may be possible that a further switching device 30 is provided in at least one of the current paths, in particular in the first current path 231. If necessary, this can also be controlled by the battery management system 400 via at least one corresponding additional control path S3. It may be possible that a first electronic switching device 21 is directly connected to the positive pole 212 of the battery 210, and a second electronic switching device 22 is directly connected to the negative pole 213 of the battery 210. In addition, it is conceivable that a measurement M or a measurement path M is provided, which enables monitoring of the battery 210 by the battery management system 400. Preferably, electrical signals can be output via control paths S as a function of this measurement and/or monitoring in order to control the respective electronic switching devices 20 as a function of the monitoring and/or measurement.

In order to now fully provide the power supply for vehicle component 2, it is necessary that both the first electronic switching device 21 and the second electronic switching device 22 are switched on (thus enabling a current flow through the respective current paths 231, 232).

For charging the battery 210, the charging system 300 may also have a charging device 310. The charging device 310, for example, comprises at least one charging plug 315 and/or at least one electrical switching component 320 for detecting the electrical charging connection.

Figure 5:
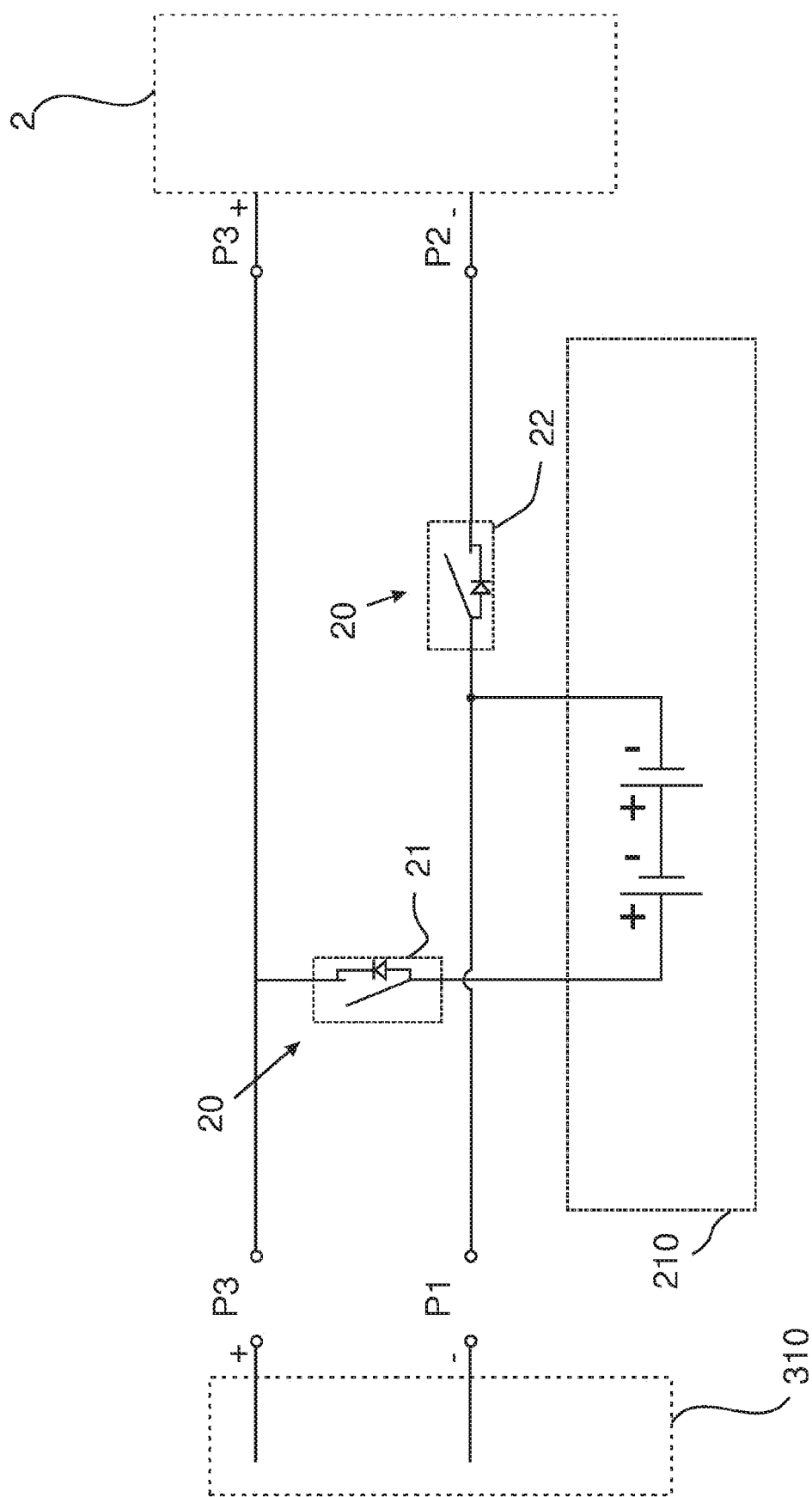

As shown in FIG. 5, the terminals of the charger 310 can be connected to the corresponding connection points P1, P3 of the battery system 200. In particular, a connection point is used for a first of the connections of the loading device 310, with which the connection to the vehicle component 2 is also made (for example the third connection point P3). In addition, a first connection point P1 is provided as the charging connection point, which serves (especially exclusively) for contacting a second connection of the connections of the charging device 310. As can be seen from FIGS. 4 to 6, the first connection point P1 is integrated in the battery system 200 in such a way that an electrical connection between the battery 210 and the first connection point P1 is also possible with a switched-off (second) switching state and/or independently of a (second) switching state of the second electronic switching device 22.

In this way, safety when charging the battery 210 can be increased by transferring the second electronic switching device 22 to a switched-off switching state during the charging process (e.g. if a mechanical and/or electrical charging connection is detected). This causes a current flow to vehicle component 2 to be blocked in such a way that a sufficient power supply for the operation of vehicle component 2 is prevented.

Figure 6:
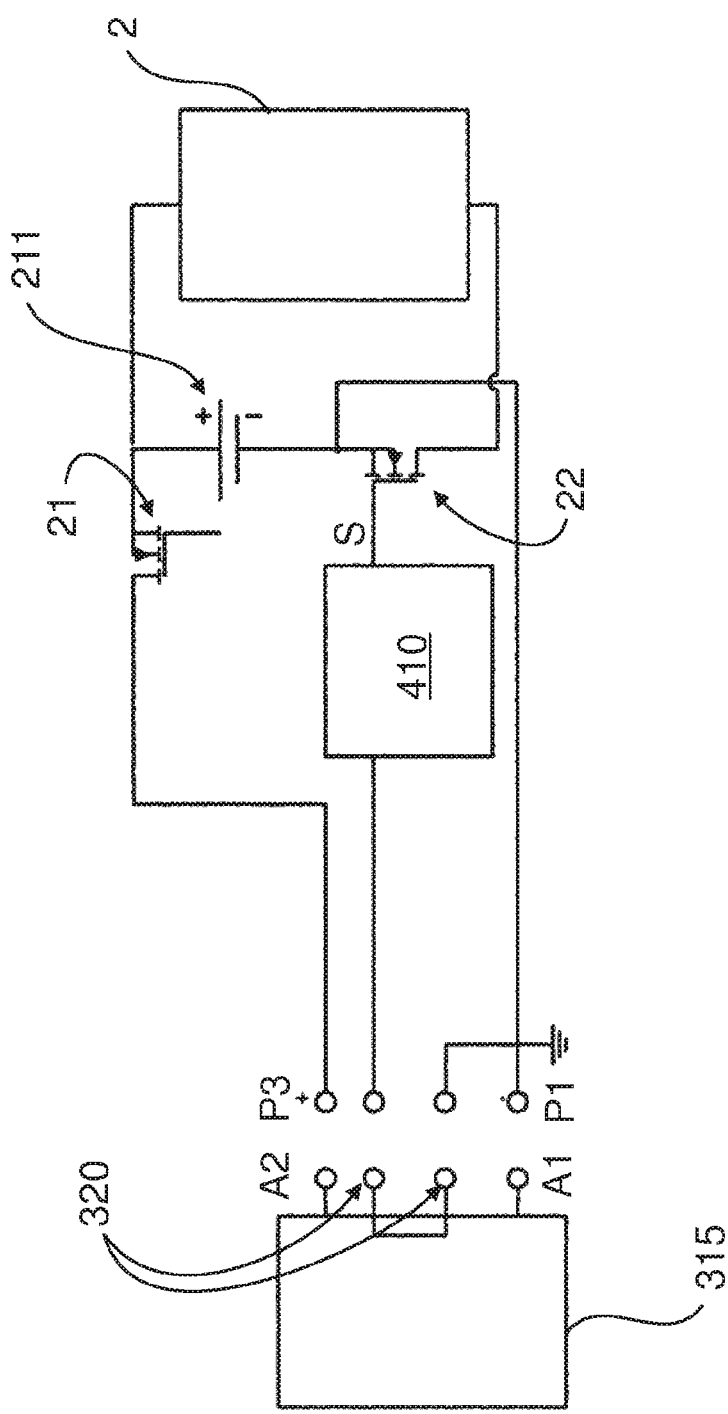

In order to further increase safety, at least one switch component 320 can be provided on the charging plug 315. FIG. 6 schematically shows, for example, that on the basis of the at least one switching component 320 by a processing device, in particular monitoring and/or operating device 410 (for example of the battery management system 400) an electrical contact between the charging device 310 and the charging component 50 of the battery system 200 can be detected. Alternatively or additionally, the mechanical charging connection can be detected by the processing device 410 or a further processing device 410, as explained in relation to FIGS. 1 to 3, e.g. by monitoring a current flow through the safety path 65. Depending on this detection, for example, a signal can then be output via at least one of the control paths S in order, in particular, to convert the second electronic switching device 22 to the switched-off switching state. In particular, the at least one switching component 320 serves to bridge two signal lines during contacting (as shown in FIG. 6). For this purpose, the switching component 320 can, for example, be configured as an electrical (in particular electrically conductive) auxiliary contact, e.g. made of at least one metal. In particular, the switch component 320 is firmly connected to the charging plug 315.

FIG. 6 also shows that the charging plug 315 can have a first terminal A1 and a second terminal A2. When contacting the charger 310 with the battery system 200, for example, the first terminal A1 can be brought into contact with the first connection point P1 and the second terminal A2 with the third connection point P3.

FIG. 7 schematically visualizes a method 100 according to the invention. In a first step 101, a charging device 310 is connected to a charging component 50 of the battery system 200 in order to establish a mechanical and electrical charging connection. In accordance with a second process step 102, switching off of at least one electronic switching device 20 to a switched-off switching state is initiated when the mechanical charging connection is detected, so that the power supply to vehicle component 2 is mostly reduced and/or completely interrupted. In a third step, step 103, the charging device 310 initiates a charging process to charge a battery 210.

The preceding explanation of the embodiments describes the present invention exclusively in the context of examples. Of course, individual features of the embodiments can be freely combined with each other, if technically reasonable, without leaving the scope of the present invention.

REFERENCE CHARACTER LIST

1 Vehicle
2 Vehicle component
20 Electronic switching device
21 First electronic switching device
22 Second electronic switching device
30 Further switching device
50 Charging component
51 Charging socket
52 Charging component housing, socket housing
53 Counter contact
60 Safety device
61 Housing
62 Switching means, opener, push-button
63 Actuating element, rocker arm
64 Spring element
65 Security path
100 Methods
101 First method step
102 Second method step
103 Third method step
200 Battery system
210 Battery
211 Battery cell
212 Positive pole
213 Minus pole
215 Battery housing
231 First current path, positive current path, positive branch
232 Second current path, negative current path, negative branch
300 Charging system
310 Charging device
315 Charging plug
316 Connector housing, charging device housing
320 Contact, switching component, bridge, plug contacts
400 Battery management system
410 Monitoring and/or operating equipment
A1 First connection
A2 Second connection
B Direction of movement, contacting movement
M Measurement, measuring path
P1 First connection point, loading connection point
P2 Second connection point
P3 Third Connection point
S Control path
S1 First control path
S2 Second control path
S3 Further control path
V Connection area

The invention claimed is:

1. A battery system for a vehicle, comprising:
at least one rechargeable battery for supplying power to at least one vehicle component of the vehicle;
a charging component for establishing a mechanical charging connection and an electrical charging connection with an external charging device to charge the at least one rechargeable battery through the charging device during a charge state;
a safety device, which is arranged at least partially in an area of the charging component, for:
detecting that a plug of the charging device has been moved into a connection area to initiate the mechanical charging connection of the charging component with the charging device; and
in response to detecting that the plug of the charging device has been moved into the connection area, and prior to establishing an electrical connection between the external charging device and the charging component, performing a safety interruption of the power supplied to the at least one vehicle component to ensure that power is not being supplied to the at least one vehicle component by the at least one rechargeable battery during the charge state.

2. The battery system according to claim 1, wherein the charging component is configured complementary to the charging device to establish the mechanical charging connection as at least a detachable force-fitting connection or a form-fitting connection, the safety device having an actuating element that adjoins the charging component, wherein when force is exerted on the actuating element by the charging device at least prior or during an establishment of the mechanical charging connection, the actuating element is configured to detect the mechanical charging connection.

3. The battery system according to claim 1, wherein a mechanical actuating element of the safety device is arranged directly or adjacent to a housing of the charging component, wherein the actuating element is in the connection area in which the charging device can be introduced for the charging connections to the charging component by a contacting movement, wherein the actuating element is configured to be actuated by the contacting movement of the charging device.

4. The battery system according to claim 1, wherein a mechanical actuating element of the safety device is arranged in the connection area of the charging component in such a way that force exerted by the charging device in a course of establishing the mechanical charging connection before at least one electrical contact of the charging device makes contact with a respective counter-contact of the charging component.

5. The battery system according to claim 1, wherein an electrical switching means of the safety device is provided and is integrated into an electrical safety path of the battery system, wherein the electrical switching means is communicatively coupled via the safety path to a battery management system and for interrupting the safety path.

6. The battery system according to claim 5 wherein
during a normal state, the switching means closes the safety path such that current flow occurs through the safety path when the charging component is mechanically disconnected from the charging device; and
during the charge state, the switching means opens the safety path such that current flow is completely or substantially prevented when the charging component is mechanically connected to the charging device.

7. The battery system according to claim 1, wherein an actuating element is arranged adjacent to a switching means and is mounted movably on at least a housing of the safety device or on a housing of the charging component to actuate the switching means, when force is exerted on the actuating element, by an at least partially linear or rotary or tilting or pivoting movement of the actuating element.

8. The battery system according to claim 1, further comprising at least one electronic switching device for establishing an electrical connection between the at least one rechargeable battery and the at least one vehicle component, wherein a control path is electrically connected to the electronic switching device so that, upon detection of the mechanical charging connection, the electronic switching device is brought into a switched-off switching state via the control path to at least partially interrupt the electrical connection of the at least one rechargeable battery to the at least one vehicle component.

9. The battery system according to claim 1, further comprising a battery management system that is electrically connected to at least one switching device via respective control paths, wherein:
when the mechanical charging connection is detected, a first electronic switching device is brought into a switched-on first switching state and a second electronic switching device is brought into a switched-off second switching state for a charging operation, and
when the mechanical charging connection is not detected, the first electronic switching device is brought into a switched-on first switching state and the second electronic switching device is brought into a switched-on second switching state for supplying power to the at least one vehicle component.

10. The battery system according to claim 1, wherein the at least one vehicle component is configured as an electric drive component of the vehicle.

11. A charging system for charging at least one battery of a battery system of a vehicle, comprising:
the at least one battery for supplying power to at least one vehicle component of the vehicle;
a charging component of the battery system for establishing a releasable mechanical charging connection and an electrical charging connection with an external charging device to transfer power;
a safety device, which is arranged at least partially in an area of the charging component, for:
detecting that a plug of the charging device has been moved into a connection area to initiate the mechanical charging connection; and
in response to the detection that the plug of the charging device has been moved into the connection area, and prior to establishing an electrical connection between the external charging device and the charging component, performing a safety interruption of the power supplied to the at least one vehicle component to ensure that power is not being supplied to the at least one vehicle component by the at least one battery.

12. The charging system according to claim 11, wherein the charging component charges the at least one battery through the charging device during a charge state.

13. A method for charging in a battery system of a vehicle, the battery system having at least one rechargeable battery for supplying power to at least one vehicle component of the vehicle, and the battery system also having a plurality of electronic switching devices, each of the plurality of electronic switching devices for producing an electrical connection between the at least one rechargeable battery and the at least one vehicle component, the method comprising the following steps:
detecting that a plug of a charging device has been moved into a connection area to initiate a mechanical charging connection and an electrical charging connection of a charging component of the battery system with the charging device;
in response to detecting that the plug of the charging device has been moved into the connection area, and prior to establishing an electrical connection between the charging device and the charging component, initiating a switch off of at least one of the plurality of electronic switching devices to a switched-off switching state to ensure the power is not being supplied to the at least one vehicle component by the at least one rechargeable battery;
initiating a charging operation to charge the at least one rechargeable battery by the charging device.

14. The method according to claim 13, wherein the battery system is converted from a sleep mode to a charge state by means of detection, a first electronic switching device being converted to a switched-off first switching state and a second electronic switching device being converted to a switched-off second switching state in the sleep mode for a complete interruption to the at least one vehicle component.

15. The method according to claim 13, wherein the battery system comprises:
the charging component for establishing the mechanical charging connection and the electrical charging connection to charge the at least one rechargeable battery through the charging device in a charge state;
a safety device, which is arranged at least partially in an area of the charging component, for:
detecting that the plug of the charging devices has been moved into the connection area to initiate the mechanical charging connection of the charging component with the charging device; and in response to detecting that the plug of the charging device has been moved into the connection area, and prior to establishing the electrical connection between the charging device and the charging component, performing a safety interruption of the power supplied to the at least one vehicle component during the charge state.

16. The battery system according to claim 2, wherein the charging device is a charging plug.

17. The battery system according to claim 3, wherein the charging component is a charging socket.

18. The battery system according to claim 7, wherein the actuating element is a mechanical rocker.

19. The battery system according to claim 8, wherein the control path is of a battery management system.

20. The battery system according to claim 10, wherein the at least one vehicle component is configured as an electric motor of the vehicle.

\* \* \* \* \*